United States Patent [19]

Ambler et al.

[11] Patent Number: 4,539,346

[45] Date of Patent: Sep. 3, 1985

[54] BINDER FOR CHEMICAL AGENTS

[75] Inventors: Michael R. Ambler, Stow; Richard R. Lattime; Edward Wanca, both of Tallmadge, all of Ohio

[73] Assignee: The Goodyear Tire & Rubber Company, Akron, Ohio

[21] Appl. No.: 592,192

[22] Filed: Mar. 22, 1984

[51] Int. Cl.$^3$ .......................... C08J 3/20; C08K 5/39; C08K 5/47; C08L 51/04
[52] U.S. Cl. .................................. 523/332; 523/334; 524/83; 524/201; 524/504
[58] Field of Search ........................ 524/504, 83, 201; 523/334, 332, 333; 525/84

[56] References Cited

U.S. PATENT DOCUMENTS

| | | | |
|---|---|---|---|
| 3,639,511 | 2/1972 | Kreibich | 525/84 |
| 3,907,930 | 9/1975 | O'Grady | 525/84 |
| 4,166,081 | 8/1979 | Fournier, Jr. et al. | 525/84 |
| 4,242,469 | 12/1980 | Schmitt et al. | 525/84 |
| 4,245,057 | 1/1981 | Starna | 525/84 |
| 4,334,039 | 6/1982 | Dupre | 525/84 |
| 4,394,488 | 7/1983 | Kim et al. | 523/334 |

Primary Examiner—Allan M. Lieberman
Attorney, Agent, or Firm—Alvin T. Rockhill

[57] ABSTRACT

Rubber chemicals, such as accelerators, are often sold in rodform binders. In order for such rods of a rubber chemical to maintain their structural integrity a polymeric binder is utilized. An improved binder for chemical agents is disclosed herein. This binder is a blend of a graft copolymer and a random copolymer.

20 Claims, No Drawings

BINDER FOR CHEMICAL AGENTS

BACKGROUND OF THE INVENTION

Rubber chemicals such as accelerators, antioxidants, antiozonants, vulcanizing agents, and fungicides are sometimes sold in rodform. It is quite frequently much more convenient to utilize rubber chemicals which are bound into rods than it is to work with such chemicals in the form of powders. Chemicals which are in powder form are often difficult to handle due to problems with dusting. Many problems associated with handling and working with rubber chemicals can be eliminated by binding the chemical agent with a polymeric binder. Thus, chemical agents can be bound into a desirable form by utilizing a polymeric binder.

Bound rubber chemical compositions can be formed into a variety of desirable shapes. Most commonly bound rubber chemical compositions are extruded into rod-like shapes or pellets. Rods and pellets of this type which are composed primarily of a rubber chemical which is bound in a polymeric binder are then generally easier to handle than the rubber chemical in powder form. However, it is important for such bound rubber chemical compositions to have and maintain a number of important properties. They must be resistant to massing together even while under considerable pressure. It is also important for such bound rubber chemical compositions to be of low tack and to avoid cohesion in order to be free flowing. This is of utmost importance in operations where automatic weighing is utilized. It is also important for such bound chemical compositions to be resistant to crumbling and dusting into fines. In other words, it is undesirable for chemical agents which are bound into rodform to crumble and dust into a powder and it is also undesirable for them to stick together forming a mass.

Frequently rubber chemicals which are bound in rodform are sold in metal drums and cans in order to protect their structural integrity. In other words, the drum or can in which the rods are packaged protect them from being crushed into a powder or massed together. Such bound rubber chemicals are normally not sold in flexible bags because of their susceptibility to being crushed and massing together. This tendency of the individual rods to mass together or to be crushed is even more likely if they are packaged in flexible bags which are stacked on top of each other. There are many advantages, economic and otherwise, to packaging such bound rubber chemicals in sacks or bags in lieu of rigid drums and cans.

SUMMARY OF THE INVENTION

This invention discloses a polymeric binder for rubber chemical agents which allows chemicals which are bound in rodform to be packaged in flexible bags without massing, crumbling, or dusting to an appreciable extent. Thus, the bound rubber chemical compositions of this invention are resistant to massing and dusting even under pressure. This invention reveals a binder for chemical agents comprised of a blend of (1) from 50 to 90 weight percent of a graft copolymer of from 55 to 90 weight percent of at least one diolefin monomer and of from 10 to 45 weight percent of at least one vinyl aromatic monomer wherein said graft copolymer has a backbone which is derived from at least one diolefin monomer with side chains which are derived from at least one vinyl aromatic monomer and (2) from 10 to 50 weight percent of a random copolymer of from 70 to 96 weight percent of at least one vinyl aromatic monomer and from 4 to 30 weight percent of at least one diolefin monomer.

This invention also reveals a bound rubber chemical composition comprised of (a) from 1 to 20 weight percent of a blend of (1) from 50 to 90 weight percent of a graft copolymer of from 55 to 90 weight percent of at least one diolefin monomer and of from 10 to 45 weight percent of at least one vinyl aromatic monomer wherein said graft copolymer has a backbone which is derived from at least one diolefin monomer with sidechains which are derived from at least one vinyl aromatic monomer and (2) from 10 to 50 weight percent of a random copolymer of from 70 to 96 weight percent of at least one vinyl aromatic monomer and from 4 to 30 weight percent of at least one diolefin monomer, and (b) from 80 to 90 weight percent of at least one chemical agent.

This invention further discloses a process for producing a bound chemical composition comprising: (1) coagulating a latex comprised of (a) from 50 to 90 weight percent based upon total polymers of a graft copolymer of from 55 to 90 weight percent of at least one diolefin monomer and of from 10 to 45 weight percent of at least one vinyl aromatic monomer wherein said graft copolymer has a backbone which is derived from at least one diolefin monomer with side chains which are derived from at least one vinyl aromatic monomer, (b) from 10 to 50 weight percent based upon the total polymers of a random copolymer of from 70 to 96 weight percent of at least one vinyl aromatic monomer and from 4 to 30 weight percent of at least one diolefin monomer, (c) water, and (d) a soap; in the presence of at least one chemical agent to produce a coagulum with the chemical agent dispersed throughout; (2) dewatering the coagulum; (3) extruding the coagulum; and (4) drying the coagulum to form said bound chemical composition.

DETAILED DESCRIPTION OF THE INVENTION

The bound rubber chemical compositions of this invention are made by introducing into a water slurry of the rubber chemical a two component latex which after a short mixing period is coagulated (precipitated) onto the rubber chemical particles. The coagulum thus produced can easily be dewatered and extruded into rods of the bound rubber chemical composition. These rods can then be dried to produce a finished product having sufficient internal strength in its structure to resist crushing, massing or sticking.

The two component latex system used in the practice of this invention is comprised of a graft copolymer and a random copolymer latex. The random copolymer is a resinous polymer which by itself lacks binding ability and which contains repeat units which are derived from at least one vinyl aromatic monomer and at least one diolefin monomer, wherein from 70 to 96 weight percent of the copolymers repeat units are derived from vinyl aromatic monomers and wherein from 4 to 30 weight percent of the copolymers repeat units are derived from diolefin monomers. In other words, these random copolymers contain from 70 to 96 weight percent vinyl aromatic monomers and from 4 to 30 weight percent diolefin monomers. It is generally preferred for these random copolymers to contain from 6 to 20 weight percent diolefin monomers and from 80 to 94 weight percent vinyl aromatic monomers. It is most preferred for these random copolymer to contain from 8 to 15 weight percent diolefin monomers and from 85 to 92 weight percent vinyl aromatic monomers. Pliolite TM VTL latex, which is sold by The Goodyear Tire & Rubber Company is an example of a random copolymer latex that can be used in the practice of this invention. Pliolite TM VTL is a random copolymer containing about 90 weight percent vinyl toluene and about 10 weight percent butadiene.

The vinyl aromatic monomers incorporated into these random copolymers generally contain from 8 to 16 carbon atoms. Some representative examples of vinyl aromatic monomers (vinyl-substituted aromatic monomers) include styrene, α-methylstyrene, bromostyrene, chlorostyrene, fluorostyrene, vinyl phenol, 3-hydroxy-4-methoxystyrene, vinyl anisole, β-nitrostyrene, vinyl toluene, 3-methylstyrene, 4-methylstyrene, 4-cyclohexylstyrene, 3-vinyl-α-methylstyrene, 4-vinyl-α-methylstyrene, 1-vinyl naphthalene, 2-vinyl naphthalene, and the like. The preferred vinyl aromatic monomers for incorporation into these random copolymers include vinyl toluene, styrene, and α-methylstyrene. The diolefin monomers which are employed in these random copolymers contain two double bonds. Some representative examples of diolefin monomers that can be used in these random copolymers include: 1,3-butadiene, 1,3-pentadiene, isoprene, myrcene, and piperylene. The preferred diolefin monomer for incorporation into these random copolymers is 1,3-butadiene. The latices of these random copolymers can be made using emulsion polymerization techniques that are well known to those skilled in the art or they can be purchased from a variety of commercial sources. These latices will, of course, be comprised of the random copolymer, water, and a soap (emulsifier). The solids content of this latex is not critical, but will generally be in the range of from 20 to 60% and will most frequently be in the range of 30 to 55%.

The graft copolymer latices used in the practice of this invention are latices of a graft copolymer having a backbone which is derived from at least one diolefin monomer with sidechains which are derived from at least one vinyl aromatic monomer. Repeat units derived from the diolefin monomer generally represent from 55 to 90 weight percent of the total weight of the graft copolymer with about 10 to 45 weight percent of the graft copolymer being derived from vinyl aromatic monomers. In other words, these graft copolymers contain from 55 to 90 weight percent of at least one diolefin monomer and from 10 to 45 weight percent of at least one vinyl aromatic monomer. It is preferred for these graft copolymers to contain from 70 to 80 weight percent diolefin monomers and from 20 to 30 weight percent vinyl aromatic monomers. It is most preferred for these graft copolymers to contain about 75 weight percent diolefin monomers and about 25 weight percent vinyl aromatic monomers. The diolefin monomers and vinyl aromatic monomers from which these graft copolymers are made are the same as those specified for use in the random copolymers. The preferred diolefin monomer for use in these graft copolymers is 1,3-butadiene with the preferred vinyl aromatic monomers being styrene, and α-methylstyrene. The most preferred vinyl aromatic monomer for incorporation into these graft copolymers is styrene.

The graft copolymers used in the binders of this invention may be synthesized using conventional polymerization techniques ordinarily used in the synthesis of graft copolymers. Emulsifiers used in the polymerization of such polymers may be charged at the outset of the polymerization or may be added incrementally or by proportioning as the reaction proceeds. Generally, anionic emulsifier systems provide good results, however, any of the general types of anionic, cationic or nonionic emulsifiers may be employed in the polymerization. Normally, such an emulsion polymerization can be run over a very wide temperature range with good results being obtained when the reaction is run from about 5° to 80° C. The polymerization of these graft copolymers may be initiated using free radical catalysts, ultraviolet light, or radiation. To insure a satisfactory polymerization rate, and a controllable polymerization, free radical initiators are generally used with good results. Free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauroyl peroxide, cumene hydroperoxide, p-menthane hydroperoxide, t-butyl hydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy)cyclohexane, and the like. Water soluble peroxygen free radical initiators are especially useful in such aqueous emulsion polymerizations.

In the preparation of the graft copolymers of this invention the diene monomer will generally be polymerized to a conversion of about 90%. At this point the vinyl aromatic monomer is added. This causes the vinyl aromatic monomer to be grafted onto the diene polymer backbone in the form of vinyl aromatic sidechains. Additional initiator and emulsifiers (soaps) can be added along with the vinyl aromatic monomer if desired. The polymerization is then continued until substantially all of the monomers present in the system have been consumed. In other words, the polymerization is continued until there is essentially total conversion of the monomers. The latices of these graft copolymers will thus be comprised of the graft copolymer, water, and soap. As was the case with the random copolymer latex, solids content is not of great importance, but these latices will generally have a solids content in the range of 20 to 65%. In most cases the latices used in the practice of this invention will have solids contents of 30% to 55%.

The rubber chemicals that can be bound by the binder systems of this invention include accelerators, ultra accelerators, antidegradants, fungicides, and the like. The rubber chemicals (chemical agents) which can be bound by the polymeric binder systems of this invention are solids which are usually powders in their unbound state. Some representative examples of accelerators that can be bound using this binder system include: thiazole accelerators, such as, benzothiazyl disulfide and 2-mercaptobenzothiazole; sulfenamide accelerators, such as, N-oxydiethylene benzothiazole-2-sulfenamide and N-cyclohexyl-2-benzothiazolesulfenamide; dithiocarbamate ultra accelerators, such as, bismuth dimethyldithiocarbamate, cadmium diethyldithiocarbamate, copper dimethyldithiocarbamate, lead dimethyldithiocarbamate, selenium diethyldithiocarbamate, tellurium diethyldithiocarbamate, and zinc dimethyldithiocarbamate; and thiuram ultra accelerators, such as tetramethylthiuram disulfide (Methyl Tuads TM), tetraethylthiuram disulfide, dipentamethylene thiuram hexasulfide, and tetramethylthiuram monosulfide.

The bound rubber chemical compositions of this invention can be prepared by first preparing a water slurry of the rubber chemical. Such slurries will normally contain from 1 to 40 weight percent of the rubber chemical. However, slurries which contain over 30 weight percent of the rubber chemical will require vigorous agitation. Normally it is preferred for such slurries to contain from 10 to 20 weight percent of the rubber chemical. A latex of the graft copolymer and a latex of the random copolymer are then added to this aqueous slurry of the rubber chemical. The amount of latex added expressed on a dry weight basis will range from 1 to 20 weight percent based on the total weight of the bound rubber chemical composition. It is generally preferred for the amount of latex added (dry weight) to range from 2 to 10 weight percent and most preferred for it to range from 4 to 5 weight percent based on the total of the rubber chemical composition.

It has been found that a ratio of the graft copolymer latex to the random copolymer latex of 9:5 results in very excellent binder systems. However, other ratios of these latices can be employed so long as the amount of graft copolymer added represents 50 to 90 weight percent of the total amount of polymers added (thus the random copolymer will represent 10 to 50 weight percent, based on total polymers).

After a short mixing period during which the aqueous slurry containing the two latices is agitated the latex is precipitated onto the rubber chemical particles. This can be accomplished using standard techniques for coagulating such latices, such as by the addition of alum, acids, and/or salts. Coagulation with acids or blends of salts with acids is usually very satisfactory. For example, sulfuric acid, hydrochloric acid, blends of sodium chloride with sulfuric acid, and blends of hydrochloric acid with methanol are generally very effective as coagulating agents for such latices. Alum can be used in conjunction with various acids to very effectively coagulate such latices. Alum refers to hydrated double sulfates of aluminum, and univalent metals such as potassium, sodium or ammonium. Aluminum alum is generally complexed with water as it is in $K_2SO_4.Al_2(SO_4)_3.24H_2O$ and $(NH_4)_2SO_4.Al_2(SO_4)_3.24H_2O$. After the latex is coagulated onto the rubber chemical particles it can be dewatered using ordinary equipment and techniques and extruded into a desirable shape. Normally it will be convenient to extrude the coagulum into rod-like shapes. In other words, most frequently the coagulum will be extruded so as to produce bound rubber chemical compositions bound in rodform. This type of system is broadly known as a rodform binder system. After the coagulum is extruded into the desired shape, it is dried to form a bound chemical composition.

The bound chemical compositions of this invention exhibit a very desirable combination of properties. They are tough and do not easily break. The fines that do form on occasional breaking are of the non-dusting type. However, these chemical compositions do disperse well upon mixing into rubber compositions when it is desirable for them to do so. For instance they readily disperse into rubber compositions upon mixing in a Banbury or mill mixer. Perhaps most importantly these chemical binders do not significantly effect cure rate or properties of the rubber composition to which they are added.

The invention is illustrated by the following examples which are merely for the purpose of illustration and are not to be regarded as limiting the scope of the invention or the manner in which it may be practiced. Unless specifically indicated otherwise, parts and percentages are given by weight.

EXAMPLE 1

An aqueous slurry containing about 15% (5600 pounds) tetramethylthiuram disulfide was prepared. About 104 pounds of Pliolite TM VTL latex was added to this aqueous slurry along with 160 pounds of a graft copolymer latex. This graft copolymer was a copolymer of butadiene and styrene in which its backbone was composed essentially of polybutadiene with sidechains grafted thereon which were composed primarily of styrene. This graft copolymer contained about 75% butadiene and about 25% styrene. This latex was coagulated by the addition of 6 pounds of aluminum potassium sulfate and about 12 gallons of a 10–15% solution of sulfuric acid. The coagulum was dewatered and extruded into rod-like shapes. The rodform binders thus produced which contain about 4.5% of the polymeric binder were then dried.

The dried rodforms were very tough and did not break into powder when vigorously thrown onto the floor. After packaging these rodforms in flexible bags they were palletized and double stacked. The rodform material from the bottom of the stack showed no evidence of massing or crumbling into fines. In fact less than 1% fines was present and they were of the non-dusting type. These bound chemical compositions disperse well upon mixing into rubber compositions when it is desirable for them to do so.

While certain representative embodiments and details have been shown for the purpose of illustrating the invention, it will be apparent to those skilled in this art that various changes and modifications may be made therein without departing from the scope of the invention.

What is claimed is:

1. A bound rubber chemical composition comprised of (a) from 1 to 20 weight percent of a blend of (1) from 50 to 90 weight percent of a graft copolymer of from 55 to 90 weight percent of at least one diolefin monomer and of from 10 to 45 weight percent of at least one vinyl aromatic monomer wherein said graft copolymer has a backbone which is derived from at least one diolefin monomer with sidechains which are derived from at least one vinyl aromatic monomer and (2) from 10 to 50 weight percent of a random copolymer of from 70 to 96 weight percent of at least one vinyl aromatic monomer and from 4 to 30 weight percent of at least one diolefin monomer, and (b) from 80 to 99 weight percent of at least one particulate solid chemical agent.

2. A bound rubber chemical composition as specified in claim 1 wherein said diolefin monomers are selected from the group consisting of 1,3-butadiene, 1,3-pentadiene, isoprene, myrcene, and piperylene, and wherein said vinyl aromatic monomers are selected from the group consisting of styrene, α-methylstyrene, bromostyrene, chlorostyrene, fluorostyrene, vinyl phenol, 3-hydroxy-4-methoxystyrene, vinyl anisole, β-nitrostyrene, vinyl toluene, 3-methylstyrene, 4-methylstyrene, 4-cyclohexylstyrene, 3-vinyl-α-methylstyrene, 4-vinyl-α-methylstyrene, 1-vinyl naphthalene, and 2-vinyl naphthalene.

3. A bound rubber chemical composition as specified in claim 1 wherein said vinyl aromatic monomers are selected from the group consisting of styrene, α-methylstyrene, bromostyrene, chlorostyrene, fluorostyrene, vinyl phenol, 3-hydroxy-4-methoxystyrene, vinyl anisole, β-nitrostyrene, vinyl toluene, 3-methylstyrene, 4-methylstyrene, 4-cyclohexylstyrene, 3-vinyl-α-methylstyrene, 4-vinyl-α-methylstyrene, 1-vinyl naphthalene, and 2-vinyl naphthalene.

4. A bound rubber chemical composition as specified in claim 2 wherein said graft copolymer contains from 70 to 80 weight percent diolefin monomers and from 20 to 30 weight percent vinyl aromatic monomers.

5. A bound rubber chemical composition as specified in claim 3 wherein said graft copolymer contains from 70 to 80 weight percent diolefin monomers and from 20 to 30 weight percent vinyl aromatic monomers.

6. A bound rubber chemical composition as specified in claim 4 wherein said random copolymer contains from 80 to 94 weight percent vinyl aromatic monomers and from 6 to 20 weight percent diolefin monomers.

7. A bound rubber chemical composition as specified in claim 5 wherein said random copolymer contains from 80 to 94 weight percent vinyl aromatic monomers and from 6 to 20 weight percent diolefin monomers.

8. A bound rubber chemical composition as specified in claim 4 wherein said random copolymer contains from 85 to 92 weight percent vinyl aromatic monomers and from 8 to 15 weight percent diolefin monomers.

9. Bound rubber chemical composition as specified in claim 5 wherein said random copolymer contains from 85 to 92 weight percent vinyl aromatic monomers and from 8 to 15 weight percent diolefin monomers.

10. A bound rubber chemical composition as specified in claim 9 wherein said vinyl aromatic monomer is styrene.

11. A bound rubber chemical composition as specified in claim 10 wherein said diolefin monomer is butadiene.

12. A bound rubber chemical composition as specified in claim 11 wherein said rubber chemical is tetramethylthiuram disulfide.

13. A process for producing a bound chemical composition comprising: (1) coagulating a latex comprised of (a) from 50 to 90 weight percent based upon total polymers of a graft copolymer of from 55 to 90 weight percent of at least one diolefin monomer and of from 10 to 45 weight percent of at least one vinyl aromatic monomer wherein said graft copolymer has a backbone which is derived from at least one diolefin monomer with side chains which are derived from at least one vinyl aromatic monomer, (b) from 10 to 50 weight percent based upon the total polymers of a random copolymer of from 70 to 96 weight percent of at least one vinyl aromatic monomer and from 4 to 30 weight percent of at least one diolefin monomer, (c) water, and (d) a soap; in the presence of at least one particulate solid chemical agent to produce a coagulum with the chemical agent dispersed throughout; (2) dewatering the coagulum; (3) extruding the coagulum; and (4) drying the coagulum to form said bound chemical composition.

14. A process as specified in claim 13 wherein said diolefin monomers are selected from the group consisting of 1,3-butadiene, 1,3-pentadiene, isoprene, myrcene, and piperylene, and wherein said vinyl aromatic monomers are selected from the group consisting of styrene, α-methylstyrene, bromostyrene, chlorostyrene, fluorostyrene, vinyl phenol, 3-hydroxy-4-methoxystyrene, vinyl anisole, β-nitrostyrene, vinyl toluene, 3-methylstyrene, 4-methylstyrene, 4-cyclohexylstyrene, 3-vinyl-α-methylstyrene, 4-vinyl-α-methylstyrene, 1-vinyl naphthalene, and 2-vinyl naphthalene.

15. A process as specified in claim 14 wherein said chemical agent is an accelerator selected from the group consisting of benzothiazyl disulfide,
2-mercaptobenzothiazole,
N-oxydiethylene benzothiazole-2-sulfenamide,
N-cyclohexyl-2-benzothiazole sulfenamide,
bismuth dimethyldithiocarbamate,
cadmium diethyldithiocarbamate,
copper dimethyldithiocarbamate,
lead dimethyldithiocarbamate,
selenium diethyldithiocarbamate,
tellurium diethyldithiocarbamate,
zinc dimethyldithiocarbamate,
tetramethylthiuram disulfide,
tetraethylthiuram disulfide,
dipentamethylene thiuram hexasulfide, and
tetramethylthiuram monosulfide.

16. A process as specified in claim 15 wherein said graft copolymer contains from 70 to 80 weight percent diolefin monomers and from 20 to 30 weight percent vinyl aromatic monomers.

17. A process as claimed in claim 16 wherein said random copolymer contains from 80 to 94 weight percent vinyl aromatic monomers and from 6 to 20 weight percent diolefin monomers.

18. A process as specified in claim 17 wherein said vinyl aromatic monomer is styrene and wherein said diolefin monomer is butadiene.

19. A process as specified in claim 18 wherein said random copolymer contains from 85 to 92 weight percent vinyl aromatic monomers and from 8 to 15 weight percent diolefin monomers.

20. A process as specified in claim 19 wherein said rubber chemical is tetramethylthiuram disulfide.

* * * * *